Dec. 28, 1926.
R. B. POINDEXTER
VALVE SEAT
Filed March 15, 1926
1,612,533
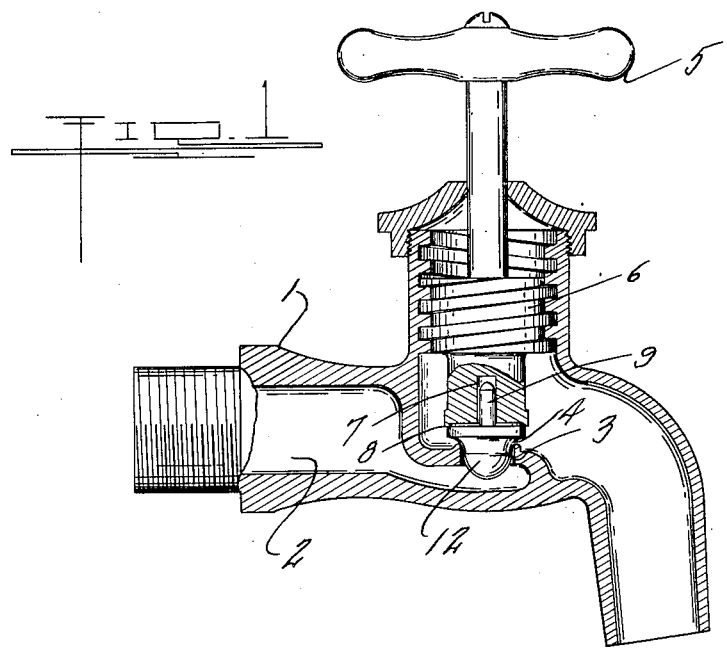
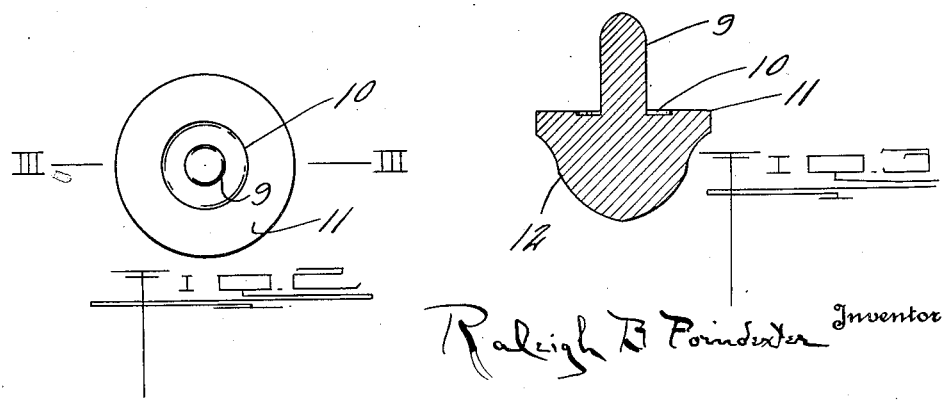
Raleigh B Poindexter Inventor
By Geo E Kirk
Attorney Patented Dec. 28, 1926.

1,612,533

UNITED STATES PATENT OFFICE.

RALEIGH B. POINDEXTER, OF TOLEDO, OHIO.

VALVE SEAT.

Application filed March 15, 1926. Serial No. 94,800.

This invention relates to valves.

This invention has utility when incorporated in loose self-centering or rockable valve closures.

Referring to the drawings:

Fig. 1 is a side elevation of an embodiment of the invention incorporated in a valve or faucet, parts of which are broken away;

Fig. 2 is a bottom plan view of the valve closure device of Fig. 1; and

Fig. 3 is a section on the line III—III, Fig. 2.

Valve or spigot 1 is shown as having passage 2 extending to opening 3 having concentrically thereof on its upper side, seat 4. Control member 5 has therefrom portion 6 rotatable in its reciprocation toward and from the opening seat 4. This control member 5 and the portion 6 are concentric of the opening 4. The portion 6 is shown as having coaxially of the opening 3 and seat 4, recess 7 about which extends seat 8 opposing the seat 4 and coaxial therewith. Loosely fitting in this recess 7, is stem 9 rising from countersink portion 10 of transversely extending ledge 11 of the closure member hereof. This closure element or member remotely from the stem 9 is provided with tapered or convex portion 12 which in assembly position in a compression type of valve may coact with opening seat 4 against the liquid pressure in the line. The loose fitting of the stem 9 in the recess 7 permits self-centering action of this convex portion 12 of the valve closure, while the ledge 11, as abutting seat 8, permits operation of the control member 5 to effect a degree of positive pressure thrust of the element into such pressure resisting valve closure position. The looseness of the stem 9 in the recess 7 allows freedom for accurate seating in effecting a snug closure. Upon opening the valve, the portion 6 with its recess 7 and seat 8 is positively withdrawn to increase clearance as to the seat 4, and the pressure from the duct 2 effects the unseating of the closure element as loosely guided and directed by the coaction of the stem 9 with the recess 7.

Reseating thereafter is repeated as in the previous instance by movement of the control member portion 6 to thrust the element back into the opening 3 so that the seat 4 is engaged by the seat 12. Due to the freedom of movement of this closure element, any inaccuracies in the opposing seats or any accumulation of grit or other material has a tendency to work clear thereof. Furthermore, this closure element is preferably metallic, and of a degree of hardness to maintain its general configuration when subjected to the compression action of the valve, but sufficiently soft as coacting between the harder seats 4 and 8, that there may be the operative re-forming for liquid tight joint between the seats 4 and 12.

In the selection of material for this valve closure, there may be an alloy of lead hardened with tin to the desired degree.

The freedom for rocking of this closure element as to the control member is given a latitude for accurate seating by the countersink portion 10 insuring clearance at all times between the stem 9 and the portions of the seat 8 adjacent the recess 7.

What is claimed and it is desired to secure by United States Letters Patent is:—

1. A valve comprising a liquid supply duct having an opening and a seat at said opening terminus, a rotatable control member concentric of and reciprocable toward and from said opening, said member being positively movable therewith and provided with a plane seat coaxial with and opposing said opening seat, there being a recess in said member away from the opening, and an integral closure member relatively shiftable as to said recess and pair of seats, said closure member having a stem coacting with said recess and thrust thereinto by liquid pressure through the opening as the control member has operated to open the valve, said closure member having a plane ledge extending transversely thereof for coacting with the control member plane seat and an opposing tapering portion opposite from the ledge for coacting with the opening seat.

2. A compression valve closure metallic integral unit of softness to conform to seating pressure and having a transversely extending ledge, a stem rising from said ledge, said ledge being countersunk about said stem and outwardly from said countersink having a plane seat, said unit on the side of said ledge away from the stem forming an enlargement having an inwardly tapering side oppositely facing from said plane seat.

In witness whereof I affix my signature.

RALEIGH B. POINDEXTER.